United States Patent
Alderdice et al.

(12) 
(10) Patent No.: US 7,539,398 B2
(45) Date of Patent: May 26, 2009

(54) DIGITAL VIDEO AND AUDIO COLLECTIBLE CARD

(76) Inventors: William K. Alderdice, 211-2300 Portage Avenue, Winnipeg Manitoba (CA) R3J 0M4; Ray P. Cormier, 91 Miramar Road, Winnipeg Manitoba (CA) R3R 1E4

( * ) Notice: Subject to any disclaimer, the term of this patent is extended or adjusted under 35 U.S.C. 154(b) by 1174 days.

(21) Appl. No.: 10/176,074

(22) Filed: Jun. 21, 2002

(65) Prior Publication Data
US 2003/0016618 A1    Jan. 23, 2003

Related U.S. Application Data

(60) Provisional application No. 60/350,993, filed on Jan. 25, 2002, provisional application No. 60/299,773, filed on Jun. 22, 2001.

(51) Int. Cl.
| H04N 5/91 | (2006.01) |
| H04N 7/00 | (2006.01) |
| H04N 7/12 | (2006.01) |
| G06F 13/00 | (2006.01) |
| G06F 15/16 | (2006.01) |
| G06F 17/00 | (2006.01) |

(52) U.S. Cl. .......................... 386/96; 386/68; 386/106; 375/240.02; 375/240.13; 463/44; 707/104.1; 709/231; 709/247; 711/112

(58) Field of Classification Search ................... 386/96, 386/68, 106; 375/240.02, 240.13; 434/118; 709/219, 223, 224, 226, 231, 247; 710/301; 463/44; 707/104.1; 711/112
See application file for complete search history.

(56) References Cited

U.S. PATENT DOCUMENTS

| 5,384,667 A * | 1/1995 | Beckwith ................... 386/55 |
| 5,408,630 A * | 4/1995 | Moss ........................ 711/112 |
| 5,597,307 A * | 1/1997 | Redford et al. ............. 434/118 |
| 5,743,801 A * | 4/1998 | Welander .................... 463/44 |
| 5,764,276 A * | 6/1998 | Martin et al. ............... 725/146 |
| 5,781,683 A * | 7/1998 | Sakoguchi et al. ........... 386/96 |
| 5,982,736 A | 11/1999 | Pierson |
| 6,016,298 A | 1/2000 | Fischer |
| 6,266,697 B1 * | 7/2001 | Miyamoto .................. 709/224 |
| 6,356,971 B1 * | 3/2002 | Katz et al. .................. 710/301 |
| 6,510,124 B1 | 1/2003 | Wood |
| 6,534,142 B1 * | 3/2003 | Hummell et al. ........... 428/40.1 |
| 6,762,988 B2 * | 7/2004 | Wood ........................ 369/273 |
| 6,899,942 B2 * | 5/2005 | Clark ......................... 428/138 |
| 6,980,595 B2 * | 12/2005 | Rose et al. ............. 375/240.13 |
| 2001/0042009 A1 * | 11/2001 | Montague .................... 705/14 |
| 2002/0027837 A1 * | 3/2002 | Weber ........................ 369/14 |
| 2003/0009542 A1 * | 1/2003 | Kasal et al. ................. 709/222 |

* cited by examiner

*Primary Examiner*—Thai Tran
*Assistant Examiner*—Syed Y Hasan
(74) *Attorney, Agent, or Firm*—Michael R. Williams; Ade + Company Inc.

(57) ABSTRACT

A digital video and audio collectible sports card which combines electronic media stored on the card with the outward appearance of a sports card or collectible, which allows the creation of an interactive, multi-media message complete with video, audio, still pictures and text is described.

2 Claims, 9 Drawing Sheets

DIGITAL VIDEO AND AUDIO COLLECTIBLE CARD

PRIOR APPLICATION INFORMATION

This application claims priority under 35 USC § 119(e) to Provisional Patent Application Ser. No. 60/299,773 filed on Jun. 22, 2001 and Provisional Patent Application Ser. No. 60/350,993, filed Jan. 25, 2002.

INTRODUCTION

Two cultural trends that continue to grow in today's society are the use of computers and consumer's interest in collectibles. Described herein is a combination and a method for preparing same which combines the traditional collectible card with the ability for same to be read by the removable media drive of a computer.

As can be seen from the Figures, the inventors claim copyright protection on the designs shown herein.

DESCRIPTION OF THE PREFERRED EMBODIMENTS

Described herein is a digital video and audio collectible card which combines electronic media stored on the card with the outward appearance of a collectible card, as discussed below. Thus, the invention allows the creation of an interactive, multi-media message complete with video, audio, still pictures and text which can be viewed using, for example, a computer CD-ROM or DVD drive or other similar device, for example, a video game player, DVD player or dedicated player.

Figure 2:
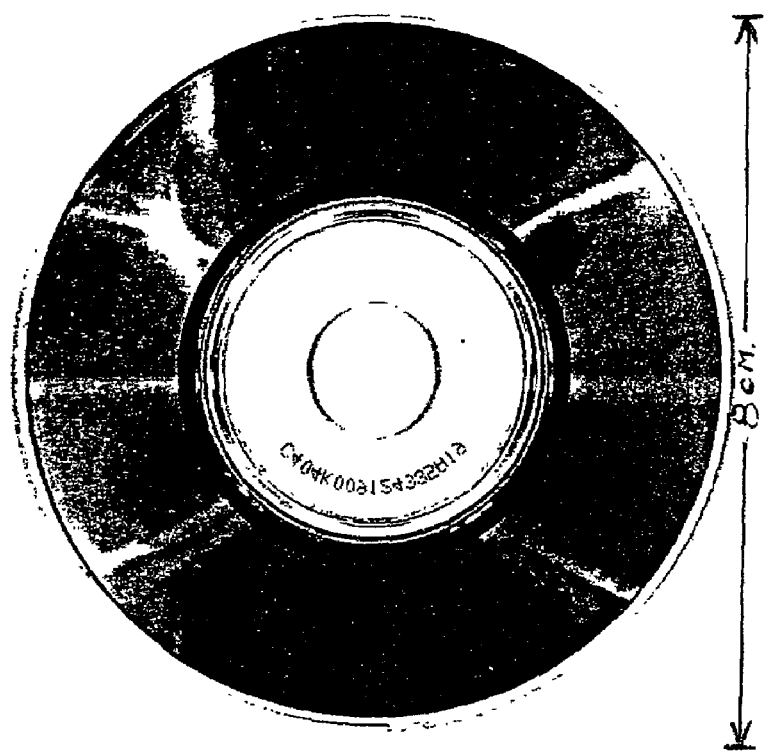
FIG. 2 shows the digital video and audio collectible card with a substantially circular shape.
Figure 1:
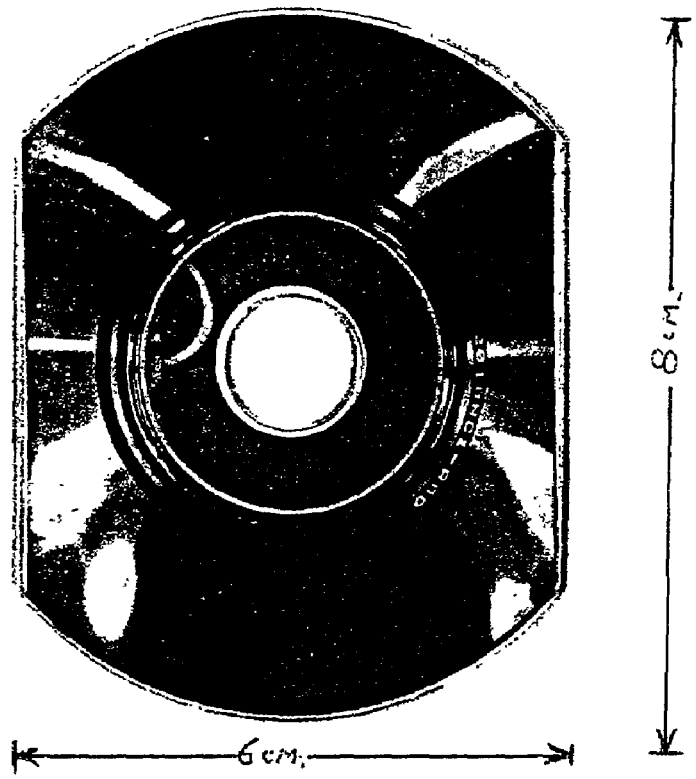
FIGS. 1 shows the digital video and audio collectible card with a substantially card-like shape.
Figure 4:
FIG. 4 shows the digital video and audio collectible card having a design for baseball-related media.
Figure 3:
FIG. 3 shows the digital video and audio collectible card having a design for hockey-related media.
Figure 6:
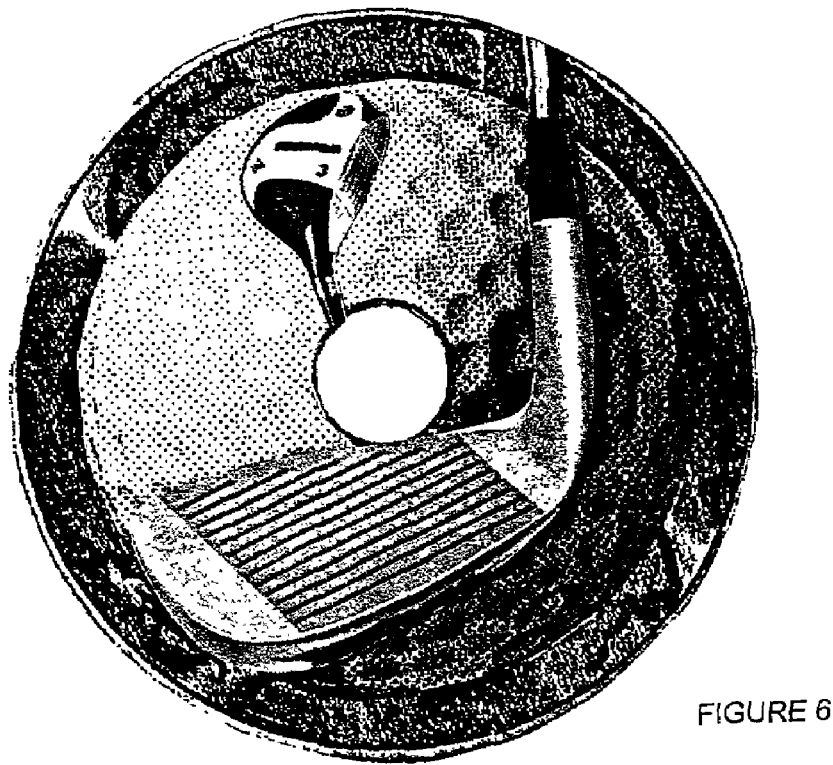
FIG. 6 shows the digital video and audio collectible card having a design for golf-related media.
Figure 5:
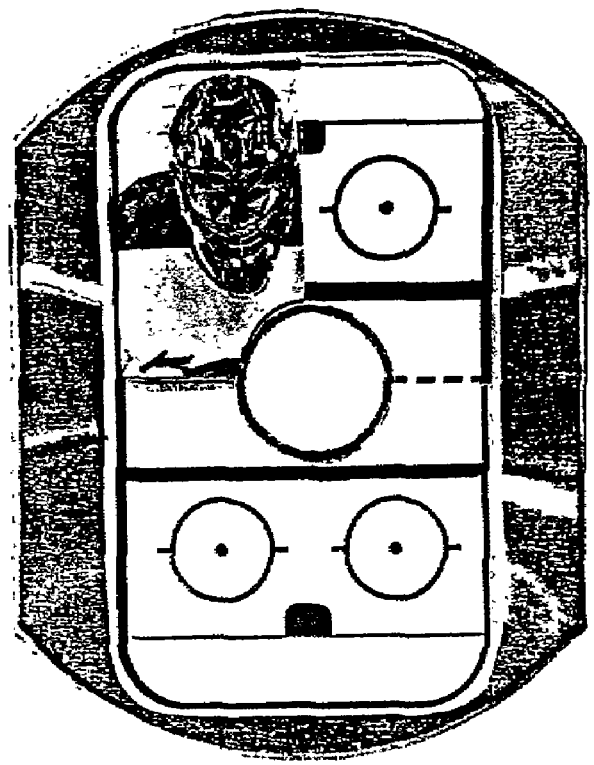
FIG. 5 shows the digital video and audio collectible card having a design for hockey-related media.
Figure 8:
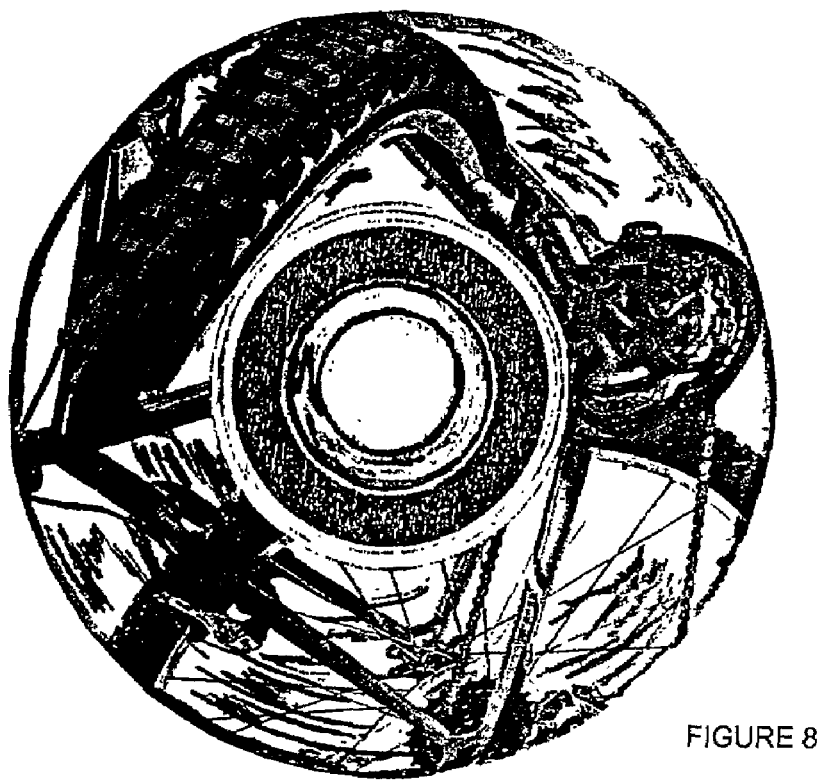
FIG. 8 shows the digital video and audio collectible card having a design for cycling-related media.
Figure 7:
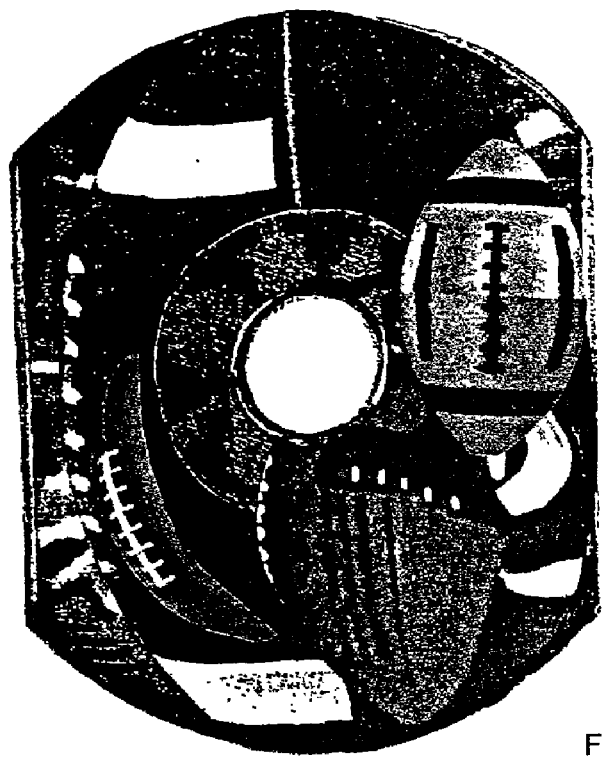
FIG. 7 shows the digital video and audio collectible card having a design for football-related media.
Figure 10:
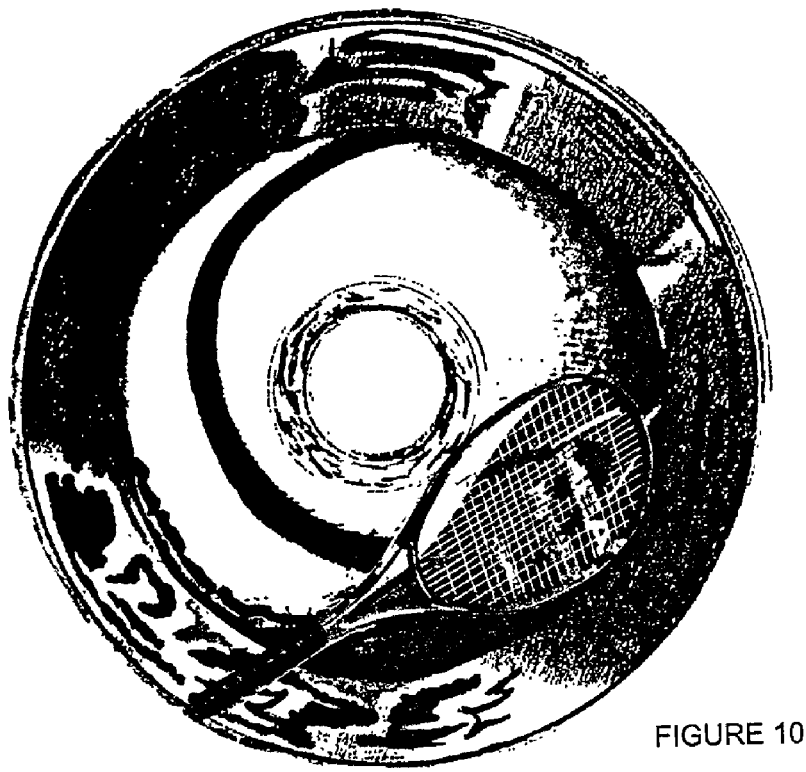
FIG. 10 shows the digital video and audio collectible card having a design for tennis-related media.
Figure 9:
FIG. 9 shows the digital video and audio collectible card having a design for soccer-related media.
Figure 12:
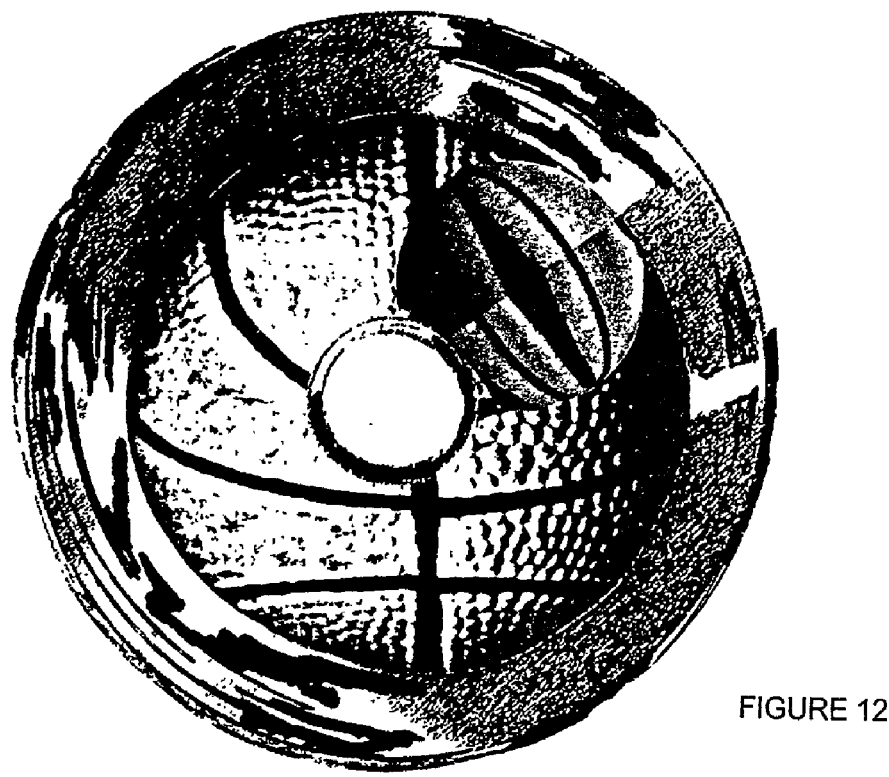
FIG. 12 shows the digital video and audio collectible card having a design for basketball-related media.
Figure 11:
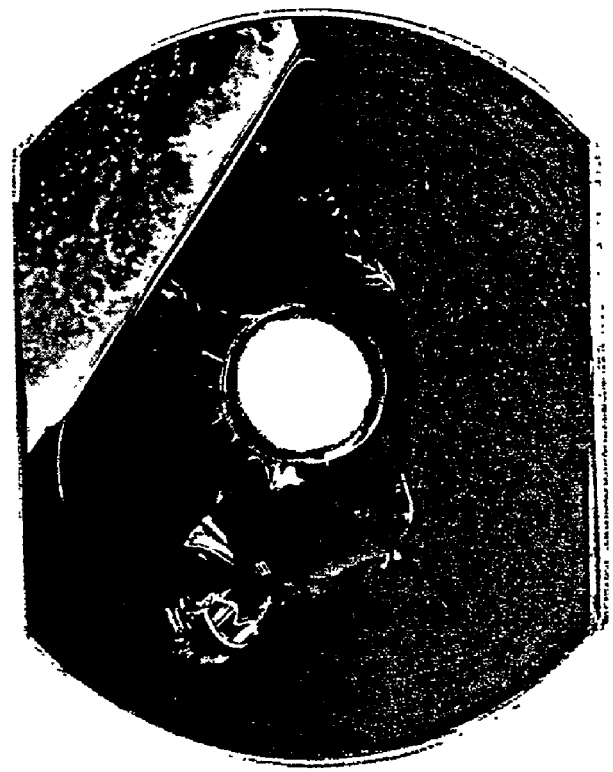
FIG. 11 shows the digital video and audio collectible card having a design for snowboarding-related media.
Figure 14:
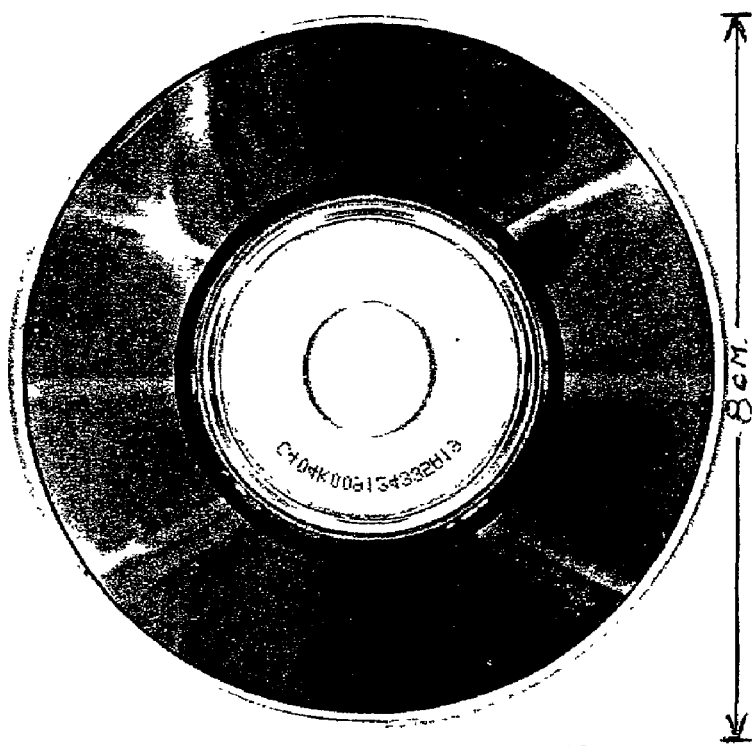
FIG. 14 shows the digital video business card with a substantially circular shape.
Figure 13:
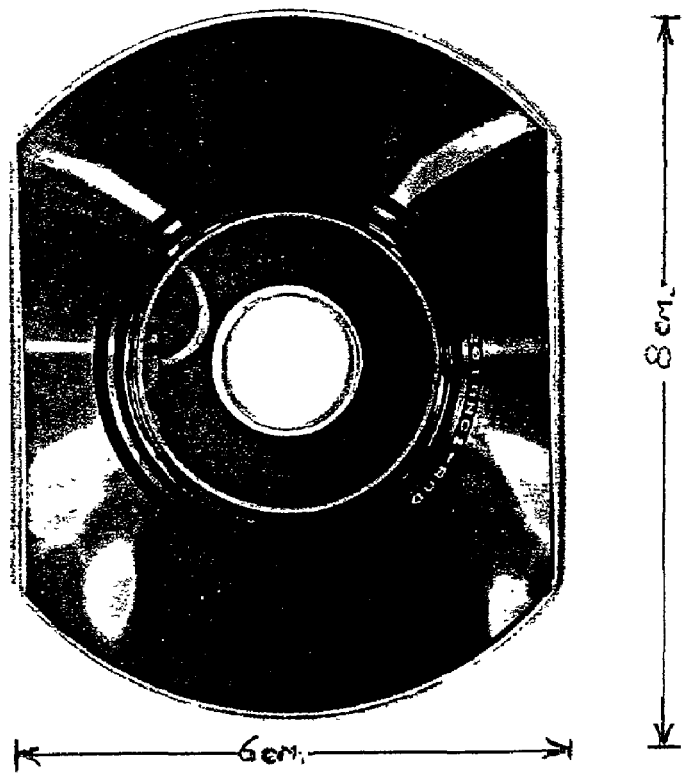
FIG. 13 shows the digital video business card with a substantially card-like shape.
Figure 16:
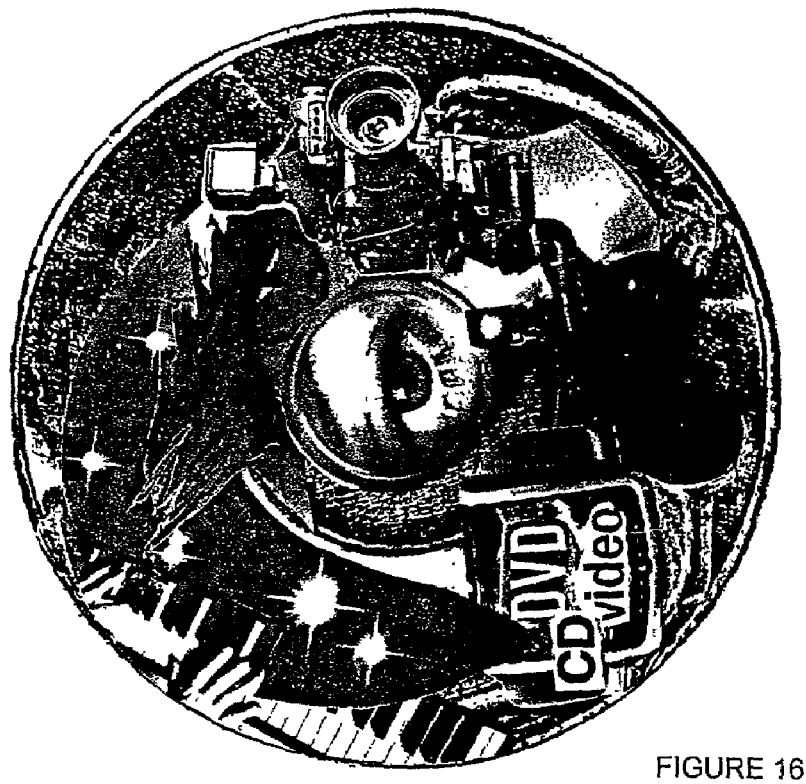
FIG. 16 shows the digital video and audio collectible card having a design for music-related media.
Figure 15:
FIG. 15 shows the digital video and audio collectible card having a design for music-related media.
Figure 17:
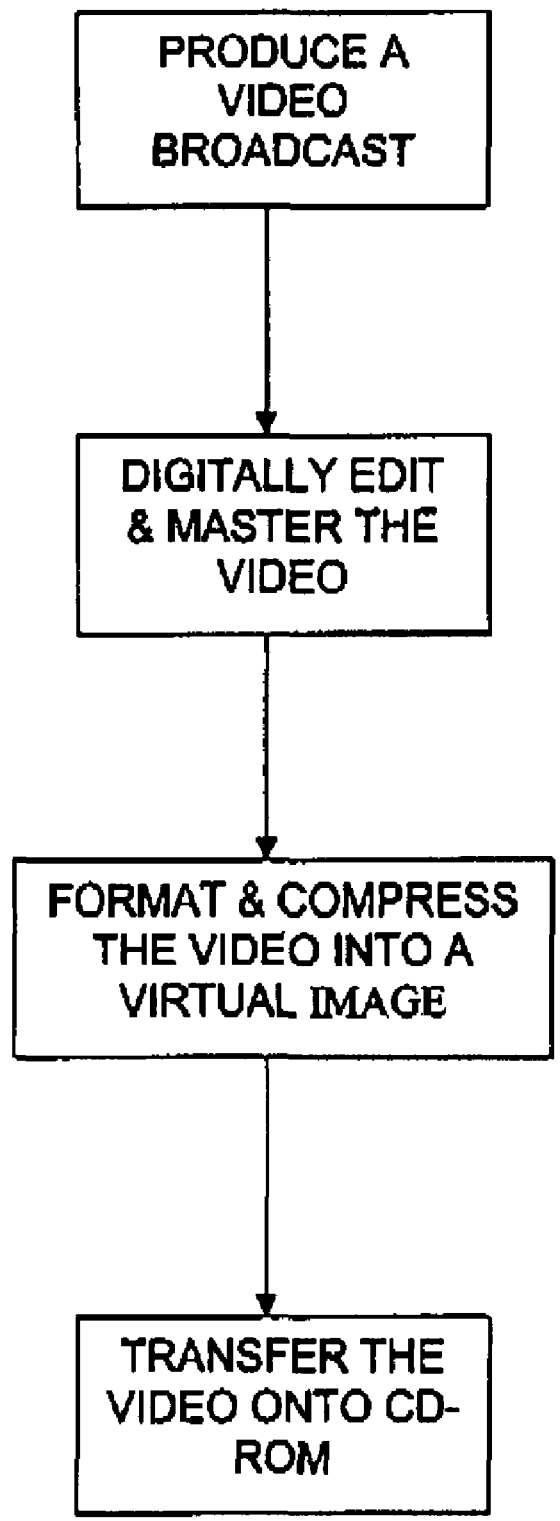
FIG. 17 shows a schematic diagram for the preparation of the digital video and audio collectible card.

Referring to the figures, a digital video and audio collectible card comprises a digital microsized 85 mb CD-ROM (Compact Disc Read Only Memory) having electronic media stored therein and indicia printed thereon. As will be apparent to one knowledgeable in the art, the microsized CD ROM is the same product and format of a full size computer CD-ROM with some exceptions. The microsized CD ROM is also referred to as the Digital Video Business Card because of its shape and size: typically, 80 mm in diameter from one curved side to the other with its top to bottom straight edge sides measuring approximately 60 mm, as shown for example in FIG. 1. It is of note that the 60 mm measurement can vary plus or minus depending on client specifications for content. It is also of note that in other embodiments, the microsized CD ROM is a circle disc of 80 mm in diameter, as shown in FIG. 2. The term "D-Card" is used hereafter to denote either embodiment shown in FIG. 1 or 2 interchangeably.

As with other collectible cards, for example, sports cards, like baseball cards, hockey cards or the like, the outer surface of the D-Card is colour printed with individual related images. For example, the D-Card may be printed with photos, for example, team photos, player photos, or the like, art work, logos, sponsors, performance statistics, dates, standings, as shown in FIGS. 3-12, although these examples are for illustrative purposes and are by no means exhaustive. The outer surface may also include other material, for example, printed content information and web links.

It is of note that there is a large market for other collectible cards, for example, fantasy card games, comic book and video game related collectible cards and the like. As will be appreciated by one of skill in the art, the invention also includes combinations of information, artwork, logos, and video stored on the D-card with suitably related indicia printed thereon, as discussed above.

In yet other embodiments, the invention comprises a digital micro sized 85 MB CD-ROM as discussed above arranged for full-screen playback of musical artist or group of artists' new release hit single digital music video or any music video release. Alternatively, excerpts from concerts or other live performances may be utilized. In this instance, the collectible media card may be intended for individual sale or to accompany the artists' latest music CD release or re-release. This serves also with the elimination of waiting to experience or view the music video on a related television-music program. It is also of note that the miniature digital music video CD will promote sharing and repeat viewing amongst fans, thereby promoting further sales. As discussed above, in these embodiments, the surface of the card is color printed with individual related images. For example, the surface may display photos, art work, titles, logos, sponsors, dates, tours and internet web links for access to continued updates.

As will become apparent to one knowledgeable of the art, the D-Card is highly efficient and has an added feature other cardboard and plastic sportscard don't have: the D-Card is arranged to automatically play back digital audio and video with DVD quality full screen on any tray drive computer. System operating requirements: The inner smaller circle portion of a regular computer tray drive for PC/Mac/Win 95/98/ME/NT/2K computers with at least 200 Mhz processor and only 16 MB of RAM.

There are nearly 100-Million CD-ROM drives in use worldwide. The entire CD technology family conforms to a set of international standards to ensure all CDs are compatible with other CD players ROM drives. The Digital Collectible Card has a capacity of 5 minutes of DVD quality full screen audio and video playback, a remarkable capacity for its determined small physical size. This powerful new way to present sports figures and statistics has autostart, plays to its end, then optionally quits, launches another video, enters a menu, or launches website links or web pages. The premium grade disc is a downsized digital card with quality playback up by compression technology applications which address digital storage, data transmission, routing, promotion or sensitive classified security. This new technology allows you to create an interactive, multi-media message complete with video, audio, still pictures and text all stored on a micro CD with a collectible longevity of 70 to 200 years depending on the primary caveat of how well you handle and store the media. This small but efficient eCollectible has a large capacity for information which translates into 5 minutes of video, a packed 8 minute visual presentation, 10,000 text pages, or 2,000 web pages with pictures and the ability to also include links to websites and email information.

In some embodiments, a television broadcast quality video is first professionally producing and then digitally edited and mastered. The edited video is then formatted into a virtual image by compression into a CD-ROM and the discs are printed and packaged with all the approved art work and related information.

The authorized web link creation on each individual disc is achieved through using a software package such as Adobe™ Acrobat, by placing a link inside a document on the disc or by automatically embedding a web link icon on the CD before burning or recording the digital micro-sized CD.

The Digital Collectible Card or eCollectible Card can be unlocked for a quintessential playback depicting, for example, players, their background, team history, championships, recapturing special moments, the history of the actual sport, archival accomplishments, annual year book, statistics, standings, band members, music labels, artists, latest news, concert updates, background information, television special appearances, concert footage, talk show appearances, award presentations and the like. Thus, the D-Card is a collectible card that actually lets you enjoy sounds and visuals on your computer. The digital music video disc thus enables a regular computer to provide DVD-quality playback of sounds and visuals. This revolutionizing concept of Digital quality with full frame playback of 640×480 resolution image when outputed to a Television will also completely fill any TV screen regardless of size.

One advantage of the D-Card is that digital signals are transmitted as precise points selected at intervals on a curve and can be transmitted and duplicated as often as one wishes with no loss of playback fidelity.

It is also of note that television broadcasters have set new standards by transmitting digital television (DTV), satisfying sophisticated home viewers who also enjoy crystal clear motion pictures on DVD players. The digital sportscard acts very much like a DVD playback but only requires a regular computer CD playback. Due to a video compression capture card technique which executes the digitizing of the enormous amount of data, the D-Card is capable of playing back automatically with a total full screen picture on any computer monitor.

DV compression of a broadcast quality video format can be stored on any digital storage device, such as a hard drive or CD-ROM. The most common form of DV compression utilizes a fixed data rate of 25 megabits per second for video of high quality image and origin. This compression is referred to as "DV25" and qualifies as broadcast quality standard. The DV sound is also of a superior quality, providing CD-quality sound recorded at 48 KHz with a resolution of 16 bits.

As will be apparent to one of skill in the art, delivery of raw video requires a fixed data rate of 90 megabits per second is needed for simple pulse-code modulation, which is not cost effective. As a consequence, it has become apparent that compression is crucial for successful delivery.

MPEG-2 is the standard for digital satellite video, which operates in bandwidths from 4 mbps to 20 mbps. This means compression video at the ratio of 23:1.

CD drives produce steady bitstreams of not much more that 1.5 mbps. Material to be stored on a CD must be compressed by a 60:1 ratio using MPEG-1. The greatest compression, more that 1400:1 is required for H.261 standard videoconferencing operating over communication links that run at speeds less than 128 kpps.

All of todays popular video-compression systems use a common strategy for encoding digital picture information. The encoder looks for frame-to-frame similarities inherent in typical video. In many sequences, for example, background areas do not change and motion of distinct objects may track predictably through the scene. The MPEG and H.26 x protocols achieve compression by transmitting a complete picture called an "I" FRAME, only two to three times per second.

Between these "I" FRAMES, predictive "P" FRAMES and bidirectional "B" FRAMES may be transmitted. These are highly compacted frames that are coded to describe only the parts of the scene that have changed. H.26 x protocols, associated primarily with live two-way videoconferencing at speeds between 56 and 1,936 kbps encode 352×288 pixels and use combinations of "I" and "P" FRAMES. MPEG-1, designated for optimum efficiency at the bandwidths available on T1 networks or CD-ROM drives (about 1.5 mbps), encodes 369×243 pixels using reordered "I", "P" and "B" FRAMES.

The "B" FRAMES are transmitted in a different order than the one they were generated in so that they can be combined at the decoder with nearby "P" FRAMES to fill in only what has changed in a picture.

MPEG-2, the successor to MPEG-1, is optimized for the digital compression of television broadcast quality material for transmission at 1.5 to 6 mbps. MPEG-2 encodes 720×486 pixels, with little visible degradation from NTSC-QUALITY VIDEO.

The National Television Standards Committee (NTSC) defines the 525-FRAME 60-FRAME-PER-SECOND broadcast and VCR standard used in North America.

MPEG-2 is expandable. The protocol permits specification of several levels of decoders, as well as different types of video sources. It is flexible enough to accommodate High-Definition television (HDTV).

MPEG, named after Motion Picture Experts Group, also defines compression of audio information. While MPEG-1 handles only left/right stereo audio channels, MPEG-2 has five compressed audio channels (left, center, right, right surround rear and left surround rear) as well as a special channel for low-frequency effects. The MPEG are highly efficient for digital audio and video transmissions.

As discussed above, the eCollectible™ or D-Card is a combination of a traditional collectible card with the ability to be read like a CD-ROM. Specifically, the eCollectible includes information traditionally found on such collectible cards, for example but by no means limited to sports statistics, tour dates, vital statistics, trivia and the like, but also includes compressed video as discussed above. Furthermore, the eCollectible, as discussed above, is arranged to have the outward appearance associated with traditional collectible cards, for example, logos, photos and the like as discussed above. Thus, the eCollectible comprises a mini-CD-ROM arranged to have the appearance of a traditional collectible card and also arranged to be read on a CDROM wherein information on the mini-CD is similar in nature to that found on traditional collectible cards, as described herein.

While the preferred embodiments of the invention have been described above, it will be recognized and understood that various modifications may be made therein, and the appended claims are intended to cover all such modifications which may fall within the spirit and scope of the invention.

The invention claimed is:

1. A method of producing a digital video and audio collectible sports card comprising:
   providing a microsized 85 MB compact disc read only memory (CD-ROM) which is 80 mm long and 60 mm wide and has indicia printed thereon such that the CD-ROM has the outward appearance of a collectible sports card;
   providing a video broadcast of at least 5 minutes;
   digitally editing and mastering the video;
   formatting and compressing the video using a video capture card to combine frames of the video into a virtual image; and
   transferring the virtual image onto the CD-ROM, thereby producing a digital video and audio collectible card, wherein said digital video and audio collectible card is arranged to automatically play back digital audio and video from said virtual image with DVD quality full screen video on any tray drive computer.

2. The method according to claim 1 wherein the CD-ROM further includes audio, still pictures and text.

* * * * *